United States Patent
Schafer et al.

(10) Patent No.: US 11,710,354 B1
(45) Date of Patent: Jul. 25, 2023

(54) SPECIALIZED ECU FOR COMMUNICATION WITH AN ENCRYPTED OR NON-ENCRYPTED VEHICLE NETWORK

(71) Applicant: InterMotive, Inc., Auburn, CA (US)

(72) Inventors: Gregory E. Schafer, Incline Village, NV (US); Dan C. Mower, Grass Valley, CA (US)

(73) Assignee: InterMotive, Inc., Auburn, CA (US)

( * ) Notice: Subject to any disclaimer, the term of this patent is extended or adjusted under 35 U.S.C. 154(b) by 765 days.

(21) Appl. No.: 16/415,191

(22) Filed: May 17, 2019

Related U.S. Application Data

(60) Provisional application No. 62/673,329, filed on May 18, 2018.

(51) Int. Cl.
*G07C 5/00* (2006.01)
*H04L 67/12* (2022.01)
*H04L 9/40* (2022.01)

(52) U.S. Cl.
CPC .............. *G07C 5/008* (2013.01); *H04L 63/164* (2013.01); *H04L 67/12* (2013.01)

(58) Field of Classification Search
CPC ......... G07C 5/008; H04L 63/164; H04L 67/12
See application file for complete search history.

(56) References Cited

U.S. PATENT DOCUMENTS

| | | | |
|---|---|---|---|
| 2001/0016789 A1* | 8/2001 | Staiger | B60R 16/0231 701/1 |
| 2017/0093866 A1* | 3/2017 | Ben-Noon et al. | H04W 12/069 |
| 2017/0250961 A1* | 8/2017 | Rasbornig | H04L 9/0819 |
| 2019/0340844 A1* | 11/2019 | Tonshal et al. | G07C 5/0808 |

* cited by examiner

*Primary Examiner* — Yuen Wong
(74) *Attorney, Agent, or Firm* — Heisler & Associates

(57) ABSTRACT

An electronic control unit (ECU) is coupled to a vehicle network, such as a controller area network (CAN), which network can be either encrypted or non-encrypted. The ECU includes input and output ports (at least one) which provides a non-encrypted access into the vehicle network. The electronic control unit, also referred to as a specialized ECU or as an enhanced gateway module, in one embodiment includes at least one port for configuring the ECU through a personal computer or other computing device. The ECU in one embodiment includes multiple input/output ports which can interface with vehicle subsystems either through or separate from the CAN. The ECU, in one embodiment, includes a non-encrypted serial data port which allows for communication between the ECU and subsystems provided by a third-party for interfacing into an OEM vehicle network, and especially an encrypted network.

17 Claims, 1 Drawing Sheet

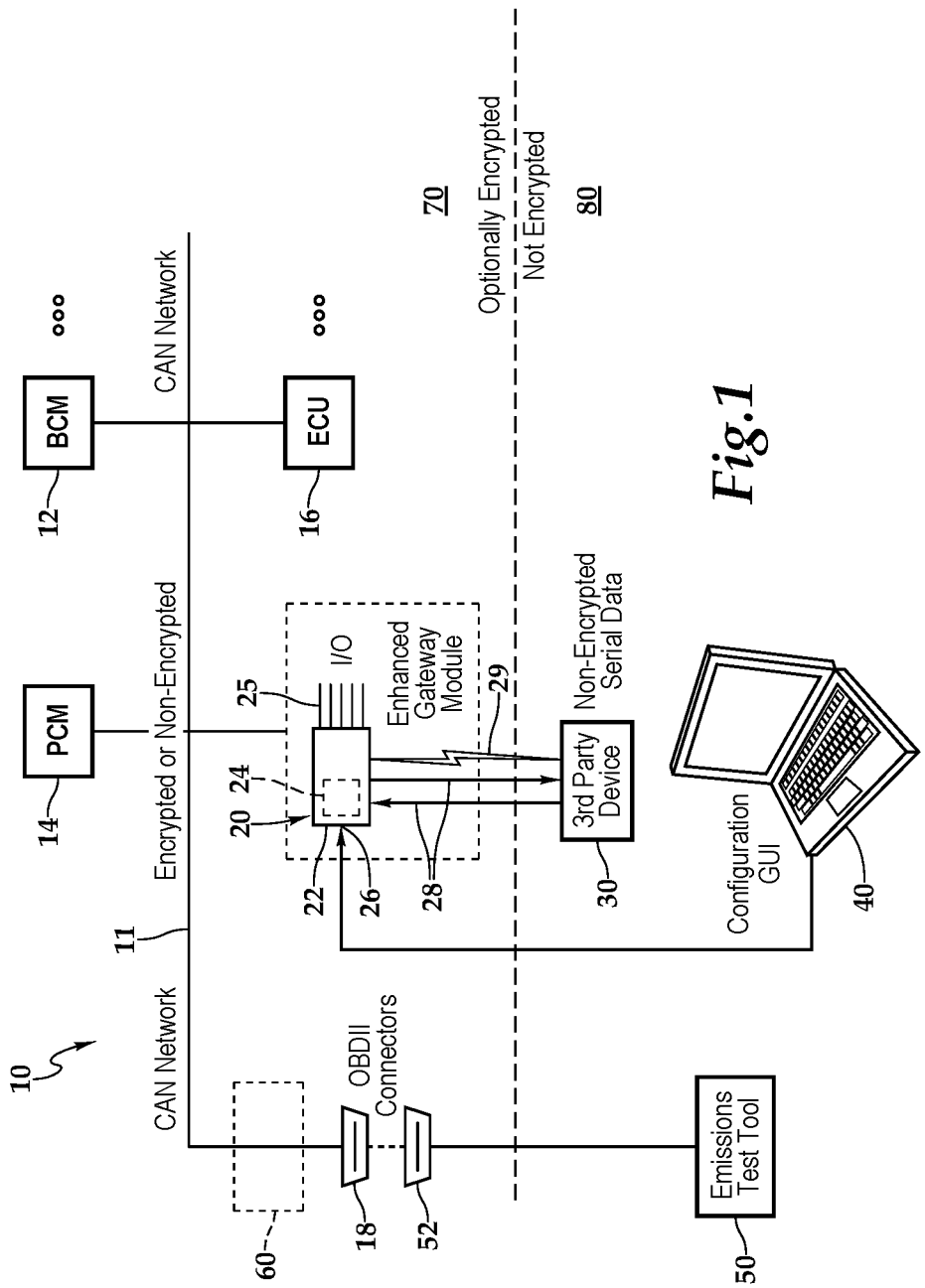

SPECIALIZED ECU FOR COMMUNICATION WITH AN ENCRYPTED OR NON-ENCRYPTED VEHICLE NETWORK

CROSS-REFERENCE TO RELATED APPLICATIONS

This application claims benefit under Title 35, United States Code §119(e) of U.S. Provisional Application No. 62/673,329 filed on May 18, 2018.

FIELD OF THE INVENTION

The following invention relates to controller area networks (CANs) or other vehicle networks which control function of various subassemblies within a land motor vehicle or similar vehicle. More particularly, this invention relates to electronic control units (ECUs) which allow for input and output from either an encrypted or a non-encrypted CAN or other vehicle network, to allow for customization and modification of vehicle subsystems, and for other purposes.

BACKGROUND OF THE INVENTION

A large worldwide market exists for specialized vehicles, which are not offered by the major car and truck original equipment manufacturers ("OEMs"). Such vehicles are sometimes referred to as "vocational" vehicles, and include, but are not limited to shuttle buses, ambulances, work trucks, fire trucks, recreational vehicles, police vehicles and so on.

These vehicles are commonly built by specialty manufacturers or "upfitters," which frequently start with a van or truck built by one of the major automotive companies, and then add the necessary equipment and electronics to create one of the chassis types listed above. These upfitters frequently need real time vehicle information, such as transmission range, vehicle speed, RPM, door status, etc., as inputs into parts of their various electrical systems and other control systems. They also frequently need to control actuators like the transmission shift lock, door locks, windows (up/down), start and stop the engine, adjust engine idle speed, and so on, as at least one output of various specialized vehicle subsystems.

Access to this vehicle information is frequently only practical via the vehicle's electronic communication network which connects the various OEM embedded electronic control units ("ECUs") on the vehicle. Controller Area Network, or CAN, is one common network technology used in many vehicles, including OEM vehicles upfitted into specialized vehicles. Connecting to this network can allow acquisition of a broad range of vehicle information, although the CAN data is generally proprietary and not published.

Cyber threats are causing OEMs to transition their CANs and other onboard vehicle networks to using encrypted data. While encryption may reduce the possibility of hostile 'hacking' of vehicle systems, an unintended consequence of encryption is that aftermarket network devices will no longer be able to acquire vehicle information or control vehicle systems. Accordingly, a need exists for specialized electronic control units or other gateway modules which can interface with the vehicle network, whether or not it is encrypted, and allow for inputs and outputs relative to the vehicle network, such as from third party (e.g. upfitter) devices, so that the modified vehicle can function as desired.

SUMMARY OF THE INVENTION

The invention disclosed herein includes a specialized ECU, connected to one or more vehicle networks (e.g. the CAN) which specialized ECU can read and decipher vehicle information. It can then act as a gateway module, using this vehicle information to provide programmable outputs, such as transmission in park (or other adjustment), vehicle speed adjustment, and other outputs frequently desired by upfitters. It can also translate this vehicle information and provide a serial data stream of at least some of the vehicle information in a predefined, published data format for use by other devices.

In addition, this invention in one embodiment has the ability to control certain aspects of the vehicle, such as fast idling the engine, locking the transmission shifter in park, locking and unlocking doors, opening or closing windows, controlling lights, honking the horn, etc. Such control includes inputs from the vehicle information and outputs to the vehicle's ECUs or to other vehicle subsystems in a particularly designed feedback loop or in more general on/off control of such vehicle actuators.

The specialized ECU can also perform Boolean logic such as AND, OR, Greater-than, Equal-to and Less-than functions based on vehicle information from the vehicle communication network (e.g. the CAN) and general purpose inputs, to provide its programmable outputs as well as provide these Boolean functions on the outgoing serial data stream.

This invention in one embodiment described herein provides a specialized ECU which is able to reside on the encrypted vehicle network, acquire and decrypt vehicle data and pass it on to upfitter or third party products in a number of ways. This specialized ECU is also able to send certain requests for actions to the vehicle over the encrypted network, such as locking the transmission shifter in park, opening or closing windows, locking doors, turning on a rear backup camera, fast idling the engine, and so on.

The specialized ECU, in one embodiment described in this invention, effectively blocks cyber-attacks by not allowing third party devices connected to the secondary serial data stream to indiscriminately send messages into the vehicle's network. This specialized ECU further would preferably not allow wireless reprogramming of its application firmware, thus it cannot be remotely reprogrammed with malicious software/firmware.

An optional feature of this specialized ECU prevents its hardware vehicle network interface connection from ever being able to originate/transmit a message onto the vehicle network. This ensures this specialized ECU can never be used to "hack" into the vehicle network and cause undesirable results. An example of doing this on a CAN network can be implemented by hard wiring the CAN interface transceiver transmit data pin to the disabled state. Thus, the module is electrically prevented from ever initiating or transmitting a message on the vehicle network in such an example. The downside to this option is that this specialized ECU can never initiate vehicle control requests such as steering, brakes, acceleration, controlling lights, engine, door locks and so on, via the vehicle's network bus or busses.

The ECU of this invention has a number of programmable outputs which can source or sink current, allowing it to drive its outputs either high (12 V) or low (ground). These outputs are useful for connecting to aftermarket upfitter products. The Boolean logic capability within the ECU allows it to create outputs which will go active depending on multiple elements of vehicle data, such as transition to the active state when the engine RPM is greater than 300 AND the transmission is in park OR vehicle speed is less than 1 MPH. Another example might be the transmission is in park OR neutral AND driver's door is open AND input 1 is on.

This ECU also provides a number of inputs which can be connected to various upfitter switches or signals. These inputs can be used in the internal Boolean logic along with the vehicle network data, both of which can be used to activate the output signals.

The ECU of this invention acquires a broad range of vehicle data from the vehicle network, whether encrypted or not. Typically, it maintains the status of this information in its internal memory, and uses this data to control its outputs based on Boolean equations. It also uses this data in forming the serial data stream that it outputs for use by third party devices. The ECU of this invention may acquire vehicle data passively, by simply reading the vehicle network data as it is broadcast by the various OEM ECUs, or it may make active requests on the vehicle network for data which may not be available passively.

The ECU of this invention in one embodiment provides one or more non-encrypted serial data streams for use by other aftermarket ECUs, such as fuel monitoring systems, or telematics systems which need to receive vehicle data, such as speed, RPM, location and so on, and which are not able to connect directly to the vehicle's encrypted network. This serial output data may be broadcast, such that data requests from other modules are not required, or it may respond to active requests from other modules.

There are a large number of existing aftermarket ECUs which use the active request method of acquiring vehicle data based on the SAE J1979 standard. Supporting this J1979 standard allows existing aftermarket ECUs to connect to the specialized ECU of this invention without modifying their design or firmware by providing such serial or other data output in a form which is outside of the encryption of the vehicle network.

The serial data provided can be wired, or wireless. Examples of wired serial data include but are not limited to various CAN protocols, such as J1939, LIN, RS485, RS422, RS232, UART 5 V, singled ended or differential data.

Wireless data can be provided in the form of RF serial data, including but not limited to Bluetooth, BLE, WiMAX, WiFi, Zigbee, or others, or a proprietary physical layer and protocol.

The specialized ECU also in one embodiment contains configuration information which it uses to know how its outputs should respond to the status of vehicle information. This configuration information can be provided to the ECU from an external source, such as a personal computer, such as to enable programmability or other adjustment. This configuration information is typically stored in non-volatile memory, so it can be permanently retained even when the ECU is not powered.

A PC/tablet/smartphone-based software application (graphical user interface) is provided in one example which allows the upfitter or other user of the specialized ECU and related serial I/O parts to define the functions of the ECU outputs based on vehicle data and also the ECUs input signals. These output definitions may be based on complex Boolean equations. Once the outputs are defined in this software application, a "configuration file" is created which can be downloaded into the specialized ECU and stored in non-volatile memory. The configuration file defines the ECU outputs, whether active high (12 V) or active low (ground), and when they are to go active based on vehicle data and ECU inputs. Thus the ECU outputs in this embodiment are software programmable.

The specialized ECU has the ability to send control requests to the various OEM ECUs on the vehicle network. This allows the ECU of this invention to request actions such as locking/unlocking the doors, opening/closing windows, locking the transmission shifter in park, changing engine idle speed (typically in park only), sounding the horn, turning on lights, activating backup camera, and so on. These requests may be based on the ECUs' inputs, or on its internal state machine determining the need for these functions.

OBJECTS OF THE INVENTION

Accordingly, a primary object of the present invention is to provide an electronic control unit which can interface with a vehicle data network of either encrypted or non-encrypted form, for communication with the network.

Another object of the present invention is to provide an electronic control unit with at least one port for inputting or outputting information from an encrypted or non-encrypted vehicle data network.

Another object of the present invention is to provide an electronic control unit which includes at least one port for programming of the electronic control unit from a separate computing device coupled thereto.

Another object of the present invention is to provide an enhanced gateway module which can be coupled to a vehicle network which is either encrypted or non-encrypted and allow for input, output, or both between the vehicle network and other units/modules, and especially those provided by third parties separate from the vehicle OEM.

Another object of the present invention is to provide an enhanced gateway module which can be coupled to an encrypted vehicle network and receive input control signals from a separate non-encrypted third-party device for controlling subsystems on the encrypted vehicle network, through the gateway module.

Another object of the present invention is to provide a method and device which allow for aftermarket subsystems to be integrated onto a vehicle using the vehicle data network associated with the vehicle, especially when the vehicle network is encrypted.

Another object of the present invention is to provide a method for accessing an encrypted vehicle data network in a manner which preserves safeguards against hacking into the vehicle data network.

Other further objects of the present invention will become apparent from a careful reading of the included drawing figures, the claims and detailed description of the invention.

BRIEF DESCRIPTION OF THE DRAWINGS

FIG. 1 is a schematic illustrating how an electronic control unit, such as an enhanced gateway module which can be coupled to a vehicle data network, such as a CAN, whether the network is encrypted or non-encrypted, and allow for configuration through a separate computer coupled to the gateway module, allow for communication with a non-encrypted serial data third-party device, and allow for input/output from the gateway module to other vehicle subsystems.

DESCRIPTION OF THE PREFERRED EMBODIMENT

Referring to the drawings, wherein like reference numerals represent like parts throughout the various drawing figures, reference numeral 10 is directed to a vehicle data network which has been modified according to this invention to allow for convenient access to the vehicle network 10 from various external devices, whether the network 10 is encrypted or non-encrypted. The vehicle network 10 can in one embodiment be a CAN (Controller Area Network) type of network 10. Access is provided through a specialized ECU 20 coupled to the vehicle network 10.

In essence, and with particular reference to FIG. 1, basic details of the specialized ECU 20 interfacing with the vehicle network 10, are described, according to an exemplary embodiment. In this example, the vehicle network 10 is typically a CAN type network, but could be any form of vehicle data network. The specialized ECU 20 is connected to this network 10 to allow for flow of data, in at least one direction, between the network 10 and the ECU 20. The ECU 20 also includes at least one port for input, output (or both) with the ECU 20 and separate from the network 10, to allow for sharing of information from (or input of instructions into) the network 10.

At least one port on the ECU 20 can be in the form of a programming port 24 coupleable to a separate computing device 40, or a serial data port 28 for coupling to a third-party device 30 or a variety of input/output ports 25 coupleable to a variety of different subsystems associated with the vehicle supporting the network 10. In one embodiment, at least one port could be the OBDII port of the network 10, through which various devices can be coupled in the same manner that the network 10 is connected to an emissions test tool 50, such as with the specialized ECU 20 placed at an alternate location 60 adjacent to the OBDII connector 18 of the network 10. While the network 10 could be encrypted or non-encrypted, when the network 10 is encrypted, some elements of this system and the vehicle network 10 can be considered to be within an encrypted zone, while other elements are coupled to the network 10 from a non-encrypted zone 80, so that the specialized ECU 20 acts as a form of gateway to allow for input and/or output communication between the non-encrypted devices and the optionally encrypted vehicle network 10.

More specifically, and with continuing reference to FIG. 1, particular details of the vehicle network 10 are described, according to an exemplary embodiment with which the system and method of this invention can be utilized. In one typical embodiment, the vehicle network 10 is of a type of network which is often referred to as a Controller Area Network (CAN). A CAN type network typically includes a main bus 11 which acts as an electrically conductive path located within a vehicle and with various different units/modules coupled to this main bus 11 for communication between different units/modules associated with the vehicle, as well as for interfacing with other units/modules, including those which might be provided by non-OEM vehicle system providers (e.g. upfitters).

While in a simplest form the bus 11 could be a single wire, most often the main bus 11 is provided as a pair of separate wires which utilize a "differential pair" type protocol for sending of signals (typically as digital signals) along the main bus 11. While the network 10 typically utilizes digital signals, it could conceivably utilize analog signals. While the signals are typically carried by modulating voltage, the signals could be carried by modulating current, or through communication protocols such as frequency modulation, amplitude modulation, and other techniques for signal transmission and processing. Furthermore, the main bus 11 could conceivably be at least partially (if not totally) eliminated and replaced with a wireless corollary, where various different units/modules would communicate wirelessly with each other, either directly or through intervening units/modules and provide communication in a wireless corresponding fashion to that provided over the main bus 11 of the vehicle network 10.

Examples of modules/units which are typically provided on a vehicle network 10 include a body control module (BCM) 12, power train control module (PCM) 14 and other various electronic control units (ECUs) 16. The body control module 12 typically controls equipment on the vehicle which is not directly related to supplying power from the engine to drive wheels, and associated functions. The BCM 12 typically controls functions such as door lock/unlock, window raise/lower, trunk release, hood release, alarm systems, and lights. The BCM 12 can in some embodiments interface with other subsystem modules/units. For instance, a BCM 12 might communicate with a door module which would control functions within a door, such as door lock, and window position. Similarly, the BCM 12 might interface with a subsystem lighting module. In other embodiments, a subsystem module such as a lighting module might connect directly to the network 10, rather than only connecting to the network 10 through the BCM 12 or other intervening module.

A power train control module (PCM) 14 provides for control of vehicle motion related functions, such as operation of the transmission, operation of the throttle, operation of the engine fuel injectors and spark, and other power related functions. In many vehicle networks 10 a transmission control module is provided separate from the PCM 14. On other networks 10, transmission control occurs through the PCM 14.

The vehicle network 10 also typically includes an OBDII connector ("onboard diagnostics 2") which connector 18 allows for connecting to an emissions test tool 50, through an appropriately shaped and sized mating OBDII connector 52 coupled to the emissions test tool 50. The connector 18 for the emissions test tool 50 is connected to the network 10 to test emissions of the vehicle and ensure that the vehicle is in compliance with air quality and other regulations. In one embodiment, and as explained in detail below, the specialized ECU 20 of this invention could either be connected directly to the vehicle network 10 by connection to the main bus 11 in a manner similar to connection of the BCM 12 and PCM 14 to the network 10, or could alternatively be provided adjacent to the OBDII connector, and conceivably interposed between the two OBDII connectors 18, 52 for convenience in attachment and detachment of the specialized ECU 20 while still allowing for connection of the emissions test tool 50 to the network 10.

The specialized ECU 20 of this invention can be implemented upon a network 10 which is either encrypted or non-encrypted. When encrypted, such encryption could be provided by each of the modules/units 12, 14, 16 coupled to the network 10, or could be provided by encoder/decoder units associated with the network 10 and interposed between each of the units/modules 12, 14, 16 and the main bus 11. If utilizing encoder/decoder units, the modules/units 12, 14, 16 would not need modification to work with an encrypted network. Encoder/decoder units would receive an encoded signal and then decode that to provide a non-encrypted signal to the unit/module 12, 14, 16. If the unit/modules 12, 14, 16 are reconfigured to receive and interpret encrypted signals, no such encoder/decoder units would be required, but rather such capability would be built into the units/modules 12, 14, 16 themselves.

Whether encryption/decryption units are utilized, an encrypted network 10 would generally operate by the various ECU's or encryption units sending their messages on network 10 in an encrypted manner. Various other units/modules on the network 10 would receive this encrypted message. Typically the message would first be recognized as encrypted, and then authorized units/modules (either directly or through an associated encoder/decoder) would properly decrypt the message to extract the underlying data signal, which can then be appropriately utilized by the unit/module which is to handle the underlying signal. In such a manner, if some portion of the network 10 is configured to receive wireless input/output (which could be an ECU 16 provided for communication of the vehicle associated with the network 10 back to a fleet operator, or a manufacture, or legal authorities), such wireless access to the network 10 would not be able to be used in an unauthorized fashion to in any way control the vehicle associated with the network 10, without the authorization associated with the encryption.

With particular reference to FIG. 1, details of the specialized ECU 20 are described, according to this exemplary embodiment. The specialized ECU 20 is preferably hard wired directly into the network 10, such as by having an electrically conductive pathway extending between the specialized ECU 20 and the main bus 11 of the network 10. The specialized ECU 20 is configured so that it can operate with both encrypted and non-encrypted networks 10. If the network 10 is encrypted, the specialized ECU 20 could be provided by a trusted provider so that the specialized ECU 20 could appropriately encode and decode messages into and from the network 10. In one embodiment, an encoder/decoder is built into the specialized ECU 20 and provided with encryption keys necessary to allow for the specialized ECU 20 to encrypt and decrypt signals passed onto or retrieved from the network 10. As an alternative, an encoder/decoder unit could be provided along the pathway between the specialized ECU 20 and the main bus 11 of the network 10. The provider of the specialized ECU 20 could be provided with encryption/decryption credentials and/or keys from an OEM, or from the owner of the vehicle, or in some other authorized fashion.

In one embodiment, the specialized ECU 20 is provided with such authorization to access an encrypted network 10 in only a limited fashion. For instance, the specialized ECU 20 could be configured to decode an encrypted message read from network 10, but not allowed to supply an encrypted signal back onto the network 10. As an example, a specialized ECU 20 with such a configuration could be configured to sense vehicle RPMs, but not control the throttle, transmission, or other subsystems of the vehicle associated with the network 10 in an encrypted fashion. Rather, the specialized ECU 20 could use the appropriately decoded sensor data to calculate various different values, for input into a Boolean algorithm, or for other purposes. If vehicle control is desired in such an embodiment with limited access to the encrypted network 10, the specialized ECU 20 could utilize one of various input/output ports 25 to send non-encrypted signals (or signals encrypted via separate encryption protocol from that provided by the OEM) to various different subcomponents of the vehicle for control thereof.

As an example, an aftermarket refrigeration system fitted onboard a vehicle might be powered with some power transfer from the vehicle engine itself. A main power system of such a refrigeration unit might be a compressor driven by a belt on the engine. Before the compressor of such a refrigeration unit is engaged, a third-party device 30 or the specialized ECU 20 itself, such as by programming with a computing device 40, would call for an extra 500 RPM of vehicle throttle position over that called for by any inputs from a vehicle operator (not to exceed redline values for the engine) before the compressor is engaged.

With such a limited system as that described above, where the specialized ECU 20 can receive signals that are encrypted from the network 10, but cannot supply encrypted signals to the network 10, the specialized ECU 20 would decode the vehicle RPM sensor value to determine the current RPM's of the vehicle. Through appropriate operation of computational algorithms operating on a micro-processor or other computing device, which could be a processor 24 within the specialized ECU 20 or could be within a third-party device 30, a calculation can be performed to determine what vehicle RPMs are required to allow for proper powering of the compressor of the refrigeration system on the vehicle.

To achieve this required elevated RPM's, one might consider making an aftermarket electrical connection to the engines throttle system. This however would cause numerous problems with the PCM which expects to be the exclusive controller of the throttle, making this an impractical solution as numerous vehicle faults would be set, and the PCM would likely put the vehicle into a "limp home" state, making normal use impossible. Elevating the idle RPM can only be accomplished on modern vehicles by a request for such over network 10, or by connecting to interface wires provided by the PCM for such a purpose. Not all vehicles provide such elevated idle interface wires.

As an alternative to separately wiring the specialized ECU 20 to the throttle system, , the throttle control message from the specialized ECU 20 could be provided over the vehicle network 10 in a non-encrypted fashion, such that the network 10 is carrying both encrypted signals and non-encrypted signals simultaneously over the same wire. A third party device 30, could make elevated idle requests of specialized ECU 20, either serially using a wired or wireless connection, or via a discrete wire connected to the Enhanced Gateway Modules I/O port 25.

In other embodiments, it is conceivable that the specialized ECU 20 could be provided with limited access to the encrypted network 10, such as only to be able to control certain units/modules, and not others. For instance, supply of messages into the network 10 might be authorized in an encrypted fashion for the body control module 12, but not for the power train control module 14. Specialized ECU 20 of different types could be simultaneously provided by an OEM. Some trusted partners might be provided with specialized ECU 20 access to an encrypted network which allows for full access both for receiving and transmitting signals on to an encrypted network 10. Other providers of specialized ECUs 20 may provide specialized ECUs 20 which can have appropriate hardware and software to allow for communication with the network 10, but such capability might be selectively provided by the OEM, only to third-party vendors and/or customers of the OEM which are desired to have such full access. Similarly, limited access could be provided to different third-party device providers and/or customers.

The specialized ECU 20 can in one embodiment be programmable with a processor 24, and typically also non-volatile memory, and optionally its own power supply, and a variety of different ports. In such a manner, a single specialized ECU 20 can be programmed, such as with a computing device 40 coupled thereto through a programming port 26, to customize the hardware of the specialized ECU 20 to configure the specialized ECU 20 as desired. In other embodiments, the specialized ECU 20 can be configured uniquely for various different OEMs and various different vehicles as custom devices. The various different ports 25, 26, 28 could be based on the USB protocol, serial port protocols, ethernet protocols, or any of a variety of other signal and/or power interconnection protocols, and with connectors appropriately configured according to those protocols. Customized other protocols could also be provided and utilized. Such "ports" could also be replaced with wireless ports which allow for porting of information into and out of the specialized ECU 20, through an antenna for transmission and receiving of such signals.

The electronic control unit 20 can be configured to be unable to originate or transmit any messages or data onto the vehicle network to prevent malicious hacking into the vehicle network 10 or other unauthorized use. Electronic control unit 20 can be connected to a vehicle network 10 which can read and decipher vehicle data and provide a secondary reformatted serial data stream. The electronic control unit 20 can be connected to an encrypted vehicle network 10 with the electronic control unit 20 able to read and decipher vehicle data and provide a secondary reformatted serial data stream 28. The electronic control unit 20 can further include programmable outputs 25.

The electronic control unit 20 can further include programmable output based on combinatorial Boolean logic of vehicle data. The electronic control unit 20 can further include programmable output based on configurable combinatorial Boolean logic of a vehicle data. The electronic control unit 20 can include programmable output based on configurable combinatorial Boolean logic of vehicle data and general purpose discrete inputs.

The electronic control unit 20 can be connected to a vehicle network 10 who's secondary serial data stream provides wired technology such as one or more of CAN, LIN, RS232, UART logic level, RS485, RS422/423, Ethernet, MOST, FlexRay, FireWire, and/or other similar technologies. The electronic control unit 20 can be connected to a vehicle that works with a primary or secondary serial data stream, using wireless RF technology 29, such as one or more of Bluetooth, BLE, Wi-Fi, Zigbee, Ant, and/or other proprietary wireless protocols and similar technologies. The electronic control unit 20 can be configured to accept a configuration file which specifies the configurable combinatorial Boolean logic of its programmable outputs 25. The electronic control unit 20 can include a graphical user interface computer software program which might run on 40, and which can be used to create and download user definable combinatorial Boolean logic definitions for each output of the electronic control unit 20, and provide a computer file from a computer device 40 which file is loadable into the electronic control unit 20, such as for custom operation thereof. This file may be loaded into non-volatile memory of specialized ECU 20.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified.

What is claimed is:

1. A vehicle data network input/output interface, comprising:
   an electronic control unit coupled to a vehicle data network; and
   at least one port on the electronic control unit, the at least one port spaced from the vehicle data network,
   wherein the electronic control unit receives and decodes network messages and provides at least one output signal through the at least one port,
   wherein the at least one port is for output of vehicle data out of the vehicle data network,
   wherein the electronic control unit receives and uses vehicle network data, but is configured to be unable to originate or transmit any messages or data onto the vehicle data network, to prevent malicious hacking into the vehicle data network,
   wherein the electronic control unit is connected to a non-encrypted vehicle network which reads and deciphers the vehicle data and provides a secondary reformatted serial data stream,
   wherein the electronic control unit is coupled to the vehicle data network at a location spaced from an OBD-II connector of the vehicle data network and directly wired into a bus of the vehicle data network, and
   wherein the at least one port on the electronic control unit being in a form of a programming port coupleable to a separate computing device, the separate computing device is separate from the OBD-II connector of the vehicle data network.

2. The vehicle data network input/output interface of claim 1 wherein the electronic control unit is coupled to the vehicle data network through an encrypted coupling for accessing the vehicle data network in an encrypted form and outputting and inputting data through the electronic control unit in a non-encrypted form.

3. The vehicle data network input/output interface of claim 1 wherein the electronic control unit is programmable.

4. The vehicle data network input/output interface of claim 1 wherein the at least one port is for input of a control signal into the vehicle data network.

5. The vehicle data network input/output interface of claim 1 wherein the electronic control unit includes a non-volatile memory.

6. The vehicle data network input/output interface of claim 1 wherein the at least one port is a serial port.

7. The vehicle data network input/output interface of claim 1 wherein the at least one port is wireless.

8. The vehicle data network input/output interface of claim 1 wherein the electronic control unit is connected to an encrypted vehicle network, wherein the electronic control unit reads and deciphers the vehicle data and provides a secondary reformatted serial data stream.

9. The vehicle data network input/output interface of claim 8 wherein the electronic control unit further includes programmable outputs.

10. The vehicle data network input/output interface of claim 9 wherein the electronic control unit includes the programmable outputs based on combinatorial Boolean logic of the vehicle data.

11. The vehicle data network input/output interface of claim 9 wherein the electronic control unit includes the programmable outputs based on configurable combinatorial Boolean logic of the vehicle data.

12. The vehicle data network input/output interface of claim 11 wherein the electronic control unit includes said programmable outputs based on configurable combinatorial Boolean logic of the vehicle data and general purpose discrete inputs.

13. The vehicle data network input/output interface of claim 1 wherein the electronic control unit is connected to the vehicle data network whose secondary serial data stream provides wired technology, selected from the group consisting of wireless technologies including CAN, LIN, RS232, UART logic level, RS485, and RS422.

14. The vehicle data network input/output interface of claim 1 wherein the electronic control unit is connected to a vehicle network whose secondary serial data stream uses wireless RF technology, selected from the group consisting of wireless technologies including Bluetooth, BLE, WiFi, Zigbee, Ant, and proprietary wireless protocols.

15. The vehicle data network input/output interface of claim 1 wherein the electronic control unit accepts a configuration file which specifies a configurable combinatorial Boolean logic of its programmable outputs.

16. The vehicle data network input/output interface of claim 1 wherein the electronic control unit includes a graphical user interface computer software program which is used to create and download the user definable combinatorial Boolean logic definitions for each output of the electronic control unit, and produces a computer file which is loadable into the electronic control unit.

17. The vehicle data network input/output interface of claim 1 wherein the electronic control unit provides general purpose inputs and outputs through a plurality of input/output ports and provides non-encrypted serial data through at least one serial data port, for use by third party devices.

* * * * *